United States Patent [19]

Swain et al.

[11] 3,861,158
[45] Jan. 21, 1975

[54] SUBMERGED PIPELINE STABILIZATION
[75] Inventors: Jack W. Swain, Bedford; Clarence T. Thomerson; Tom C. Waldrop, both of Arlington, all of Tex.
[73] Assignee: Regal Tool & Rubber Co. Inc., Grapevine, Tex.
[22] Filed: Feb. 7, 1973
[21] Appl. No.: 330,396

[52] U.S. Cl. .............. 61/72.1, 61/50, 138/106, 138/112, 248/49, 248/358
[51] Int. Cl. ...... E02d 27/46, E02d 27/52, F16l 1/00
[58] Field of Search ...... 248/49, 358; 61/72.1, 72.3, 61/50, 46, 43; 138/112, 68 R, 106; 403/389, 400

[56] References Cited
UNITED STATES PATENTS
1,821,234  9/1931  Parker ............................... 138/112
3,734,138  5/1973  Brown ............................... 248/49 X
3,779,027  12/1973  Murphy ............................. 61/72.3

FOREIGN PATENTS OR APPLICATIONS
1,430,272  1/1966  France ............................... 403/389

Primary Examiner—Jacob Shapiro
Attorney, Agent, or Firm—Richards, Harris & Medlock

[57] ABSTRACT

A submerged pipeline stabilizer in which an elastomeric casing structure has a saddle enveloping a portion of the pipeline and means to introduce a settable cement into said casing at least in part to control the shape of said stabilizer.

11 Claims, 4 Drawing Figures

SUBMERGED PIPELINE STABILIZATION

BACKGROUND AND SUMMARY OF THE INVENTION

This invention relates to pipeline underwater anchor systems, and more particularly to methods of and apparatus for maintaining the position of submerged pipelines.

Interest in the development of undersea petroleum reserves accelerates with diminishing oil and gas reserves. There are now and will be many more undersea pipelines subject to forces tending to move them. Some lines must necessarily cross one another. In such case vertical separation of a predetermined distance must be maintained at each such crossing of submerged pipelines.

Heretofore, construction of structures intended to maintain the required vertical separation between crossing undersea pipelines has been very time consuming and expensive. Such structures have been formed by raising the upper pipeline by means of a winch mounted on a ship or barge. Thereafter divers position porous bags containing a mixture of portland cement and sand around and on top of the lower pipeline until a suitable pyramid or other suitable bulk form is achieved for receiving and supporting the upper pipeline. Such structures automatically are to stabilize by the infusion of water to form concrete.

The foregoing procedure for the construction of a submerged pipeline crossing structure has proven to be unsatisfactory. Often they must be constructed at considerable depths in which case a diver can work only a very short time before returning to the surface. This means that the construction process is unduly time consuming. Divers are paid on a per diem basis and not for submerged time. The cost involved in constructing an undersea pipeline crossing by means of porous bags filled with portland cement and sand often exceeds $100,000. The present invention provides a pipeline separation system which overcomes the foregoing and other disadvantages.

Further, many product lines tend to be buoyant when empty and must be anchored. Prior anchors have involved pegs driven into the sea floor and strapped together across the top of the line at suitable intervals. To avoid such requirements, some pipelines have been coated at great expense with high density material to avoid any tendency toward flotation. The present invention provides a ready means to anchor single lines in avoidance of the problems of the prior art.

In accordance with one aspect of the invention, there is provided a unitary structure adapted to fix the relationship between crossed undersea pipelines and particularly to maintain the required vertical separation. The structure preferably comprises upper and lower elastomeric members with a filler therebetween to provide saddles which receive and at least partially envelop the upper and lower pipelines.

In accordance with one aspect, a flexible casing is employed which is positioned over one undersea pipeline. The casing is deflated and rolled or folded for ease in positioning on the lower pipelines by divers. Once positioned, it is filled with a cementitious setting material. The casing preferably is of elastomeric material partially to conform to each pipeline to form a saddle.

In accordance with another aspect of the invention, there is provided relatively rigid upper and lower elastomeric members having the saddles preformed therein. A flexible casing interconnects the upper and lower elastomeric members. The unit is submerged and positioned between a pair of crossing undersea pipelines with the casing deflated. Thereafter the casing is filled with a cementitious setting material to provide structure for maintaining the necessary separation between the pipelines. The upper and lower elastomeric members are preferably secured to the casing to angle the saddles in accordance with the relative angle between the pipelines.

In a third aspect of the invention, upper and lower relatively rigid elastomeric members have pipeline receiving saddles preformed therein and are spaced apart by a third elastomeric member positioned between the upper and lower members to maintain the necessary separation between crossing undersea pipelines received in the saddles. Structure is provided to adjust the angle between the saddles in accordance with the angular relationship between the pipeline. The third member may be provided with an annular flexible casing to be filled with a cementitious setting material in order to further anchor the unit.

DESCRIPTION OF THE DRAWINGS

A more complete understanding of the invention may be had by referring to the following detailed description when taken in conjunction with the accompanying drawings, wherein.

DETAILED DESCRIPTION

Figure 1:
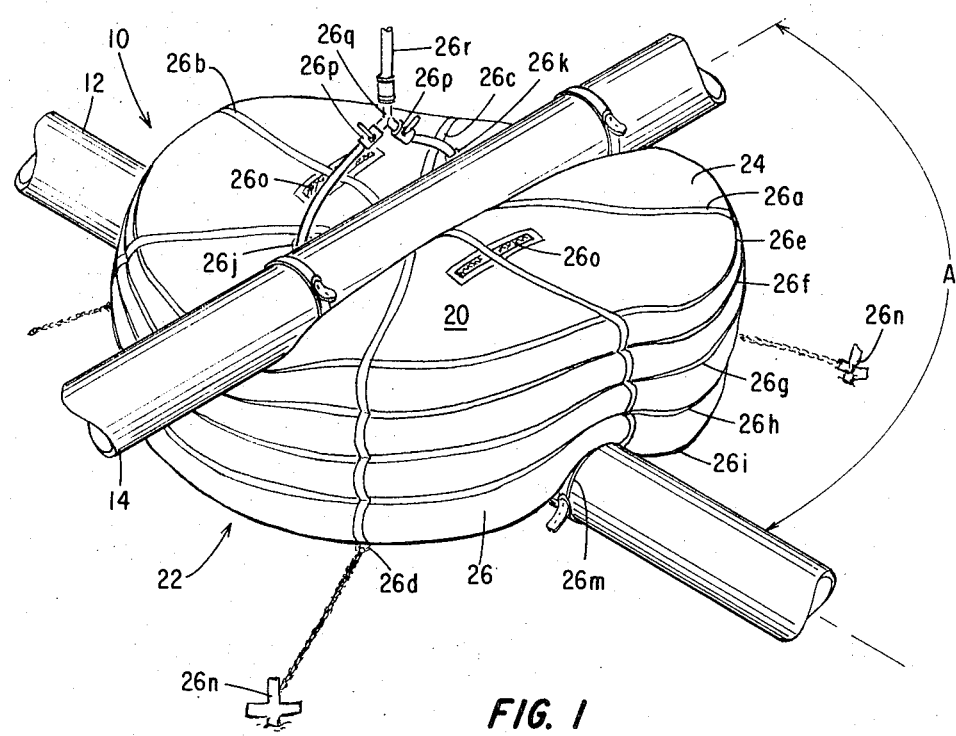
FIG. 1 illustrates an installation of a pipeline separation system incorporating a first embodiment of the invention.

Referring now to FIG. 1, an underwater pipeline crossing 10 where a lower pipeline 12 is crossed by an upper pipeline 14 at an angle A. Angle A may vary anywhere from a few degrees to 90°. Further, the pipelines 12 and 14 may vary widely in size as well as materials.

The unit shown in FIG. 1 is particularly suitable for use in areas where the sea floor is firm. As will be explained, it may not be suitable in areas where the bottom is of soft mud for considerable depth. In FIG. 1 vertical separation between the lines 12 and 14 is maintained by structure including a flexible casing 20 formed of a lower flexible elastomeric layer 22, an upper flexible elastomeric layer 24, and an elastomeric side wall 26 extending between the lower layer 22 and the upper layer 24. Casing 20 is dimensioned keeping in mind the sizes of lines 12 and 14 to provide support over a length of the order of from five to 10 diameters of the line 14 while maintaining the required separation between line 12 and line 14. Casing 20 forms a pillow which serves as a form for grout to be introduced therein. Casing 20 is disk shaped.

In one embodiment casing 20 was made of 16 oz. Neoprene impregnated Nylon fabric, reinforced at all stress points with 2 inch wide 6000 pound tensile strength Nylon straps 26a, 26b and 26c which extended radially. Straps leading to connecting rings 26d were installed on the bottom 22. Flexible circumferential loops 26e, 26f, 26g, 26h and 26i encircle casing 20 to assure rise of the side walls during grouting.

Two inlet ports 26j and 26k were provided on the top, formed of paired 2 inch polyvinyl chloride flanges bolted across the reinforced casing material, and with pipe threaded connections to which quick coupling adapters were connected. An internal baffle was provided to absorb the force of the entering grout stream without damage to the casing.

Pipe connection straps 26m were provided with snaffle hooks and quick tightening D rings. The six terminations of lower plane radial reinforcement straps were fitted with D rings for connecting to anchors 26n where needed.

Two small Nylon-screening openings 26o in the top of casing 20 allowed the escape of any air or water trapped inside to serve to prevent rupture of casing 20 upon any accidental overfilling with grout.

Preferably casing 20 is of neutral buoyancy so that it can be submerged and placed in position by one diver. Rings 26d may be used to connect weights for negative buoyancy, or to attach anchors for use where currents create a problem holding casing 20 in position preparatory to filling with concrete.

When positioned, casing 20 is connected by way of an input manifold 26q to a grout supply line 26r. Grout lines and fittings conveniently may be of two inch diameter with quick couplings for ease in operation by divers. Divers may find the system visible or may have to operate by feel where visibility is poor. When the desired degree of grout inflation is accomplished, the input manifold 26q is removed, to be used again. Closure of the input ports is not required as the heavier-than-water grout stayed in place until set.

To facilitate installation of casing 20, upper line 14 is raised relative to the lower line 12 as by a sling connected to a winch or derrick mounted on a surface vessel whereupon casing 20 is positioned between line 12 and line 14. As above noted this is preferably accomplished with casing 20 deflated and collapsed. Grout manifold 26q is coupled through valves 26p to the interior of casing 20. Hose 26r extends to a surface supply which may be on the same ship or barge from which the upper pipeline 14 is supported in the raised position.

Hose 26r is utilized for flow of cementitious setting material into the casing 20 through valves 26p. During the filling operation, air and water flow out of casing 20 through screened openings 26o. Casing 20 is thus substantially entirely filled with the cementitious setting material. Emergence of concrete which is generally warm through openings 26o may be sensed by a diver to indicate casing 20 is full of grout. Since side wall 26 of casing 20 is provided with horizontal and vertical stiffening members 26a–c and 26e–i only limited horizontal expansion is permitted and vertical rise of the side during the filling operation is assured.

Since the upper and lower elastomeric members 22 and 24 are resilient, the lower elastomeric member 22 and the cement in casing 20 forms a saddle over line 12. After casing 20 is filled with cement, upper line 14 may be lowered before the cement sets by its supporting sling and winch to a position such as shown in FIG. 1. By this means member 24 and the cement casing 20 form an upper cradle partially enveloping line 14.

After line 14 has been lowered onto casing 20, the cement sets so that casing 20 becomes rigid to maintain the predetermined or required spacing between lines 12 and 14. Hose 26r and the supporting cradle may be removed after the cement has set sufficient to support line 14. The cradles formed in the top and bottom of casing 20 give assurance that the relative positions of lines 12 and 14 and pillow 20 will be maintained.

Because of the low profile presented by pillow 20 of FIG. 1, it may advantageously be employed to hold down underwater pipelines where no crossing is involved but where the pipeline location must be maintained against any tendency to float, actions of currents, tidal forces, and other subsurface disturbances. In such case, the same casing shown in FIG. 1 may be lowered onto a pipeline to be stabilized and strapped thereon as by straps 26m and then filled with grout to provide a pillow overlying the pipeline thereby to anchor the same. Thus, the same structure as shown in FIG. 1 may be employed for assuring separation between crossing pipelines as well as to provide an anchor for a pipeline where no crossing is involved.

The installation illustrated in FIG. 1 represents an idealized case. This structure is satisfactory for crossing separation as heretofore mentioned particularly where the sea floor on which the pipe 12 rests is fairly firm and solid.

The sea floor in many areas where pipelines are installed or cross is characterized by thick bottom sections of unconsolidated mud. In such areas, the pipeline 12 may be somewhat elevated above the bottom of the unconsolidated mud layer. When such is the case, utilization of the casing 20, FIG. 1, may not be satisfactory to maintain a large separation pipeline crossing between lines although it would be satisfactory for stabilizing a single pipeline. However, in pipeline separation at some soft bottom crossing locations, it will be apparent that as the casing 20 is filled with grout, it would drape over line 12 with droop on opposite sides sufficiently to form or encounter a firm bottom during downward movement.

Figure 2:
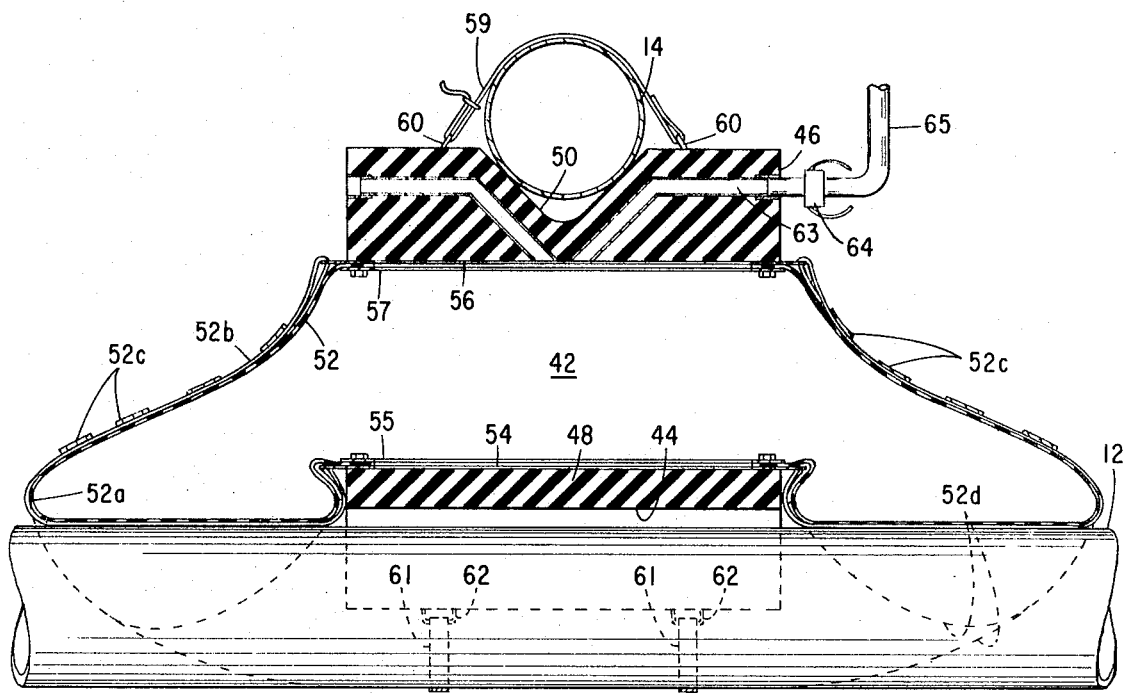
FIG. 2 is a sectional view of a pipeline separation system incorporating a second embodiment of the invention.

In areas where the sea floor is so unconsolidated as to render the system of FIG. 1 ineffective, the system illustrated in FIG. 2 will be preferred. Pipeline separation unit 42 of FIG. 2 includes relatively rigid lower and upper elastomeric members 44 and 46 having line receiving saddles 48 and 50 preformed therein, respectively. A flexible elastomeric casing 52 is attached between members 44 and 46.

Members 44 and 46 are provided with annular fastening rings 54 and 56, respectively. The rings 54 are formed from a material which is not subject to attack by salt water and are preferably molded into members 44 and 46 as to be rigidly secured thereto. Cooperating annular fastening rings 55 and 57 are bolted to rings 54 and 56, respectively, to clamp the edges of casing 52 whereby members 44 and 46 are secured to casing 52. The angular relationship between the saddles 48 and 50 is adjusted to correspond with the angle between crossing pipelines where the unit 42 is to be installed.

Member 46 includes two pair of tie down loops 60 which extend parallel to the saddle 50. Loops 60 are molded into member 46 so as to be rigidly secured therein. Bands such as band 61 are secured to loops 60 and pass over line 14 to tie member 46 to line 14. Similarly, bands 61 extend from loop 62 on member 44 to secure the same to pipe 12. Casing 52 preferably is made of gored sections to form a substantially protruding waist section 52a below the restricted neck clamped between rings 56 and 57 and the restricted skirt clamped between rings 54 and 55. Radial bands 52b are looped between rings 54 and 56 to provide support to casing 52. Circumferential bands 52c are interconnected with bands 52b at spaced points above waist 52a. With casing 52 so shaped and supported, it will facilitate use in areas where the sea bottom is firm as well as in more difficult areas. In areas where the bottom is soft mud, the casing 52 when filled may assume the configuration represented by line 52d and will still be fillable with grout in the zone between members 44 and 46 to maintain the desired vertical separation between lines 12 and 14.

In use of unit 42, a crossing is first prepared by raising upper line 14. Unit 42 is then submerged and positioned between lines 12 and 14. This is preferably accomplished with casing 52 deflated.

Unit 42 is positioned with saddle 48 partially enveloping line 12 where secured by straps 61. Line 14 is then cinched into saddle 50 of member 46 by straps 59. By this means line 14 is secured to member 44 with the pipeline partially enveloped by the saddle 50.

Unit 42 is then filled with cement. For this purpose member 46 has a radial channel 63 therein with a coupling 64 for attachment to line 65. A radial vent passage 66 is also provided for escape of water or air from casing 52. By this means casing 52 may be filled with the cement.

When full, two highly desirable characteristics are present. First, a predetermined separation is established between member 44 and member 46. When the cement has set, there is assured the required separation between lines 12 and 14. Second, the flexible waist of casing 52 is substantially greater in girth than member 44. The cement forces the flexible casing 52 to droop downwardly and around member 44 and around line 14, thereby providing a broad base for support of unit 42.

Figure 3:
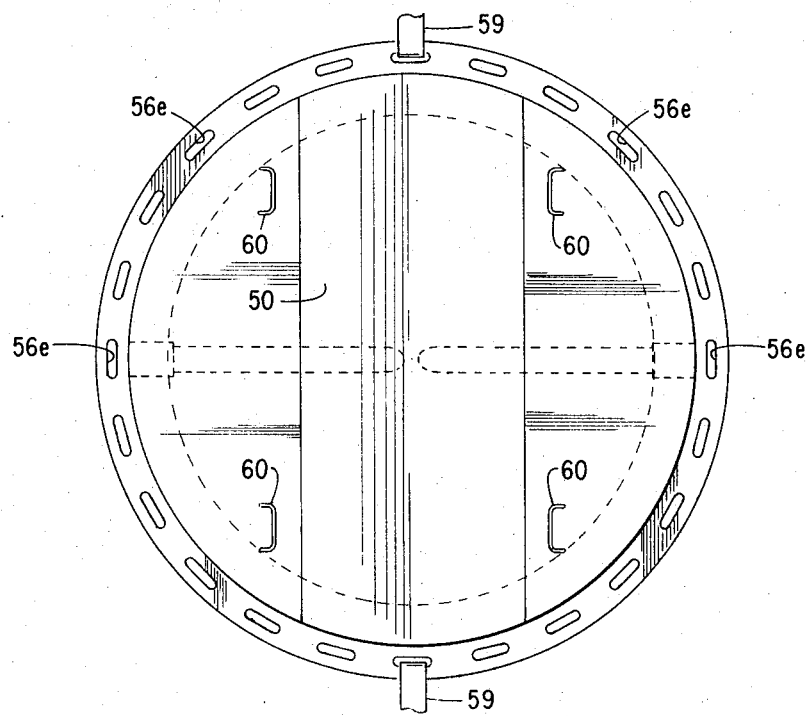
FIG. 3 is a top view of the pipeline separation system shown in FIG. 2.

In FIG. 3 the unit 42 has been shown in a top view. The upper member 46 is shown with the two pair of loops 60 extending from the upper surface on opposite sides of the channel 50. The flange 56 is shown extending beyond the vertical walls of the upper member 46. The flange 56 is provided with peripheral slots 56e through which the straps 56b pass and are secured.

In one embodiment of the system shown in FIGS. 2 and 3 the upper member 46 was a rubber disk 4 feet in diameter and 1 foot in length. The outer diameter of the flange 56 was 54 inches. The slots 56e were spaced around the periphery of flange 56 at 15° intervals. Thus, in this embodiment there were twenty-four radial straps 52b provided for the support of the envelope 52. The saddle 50 was formed with a 3 inch bottom radius and wall angles at 45° with the mouth thereof being about 20 inches wide. Such a system would therefore accommodate lines of various diameters above about 8 inches in diameter to about 24 inches in diameter.

Figure 4:
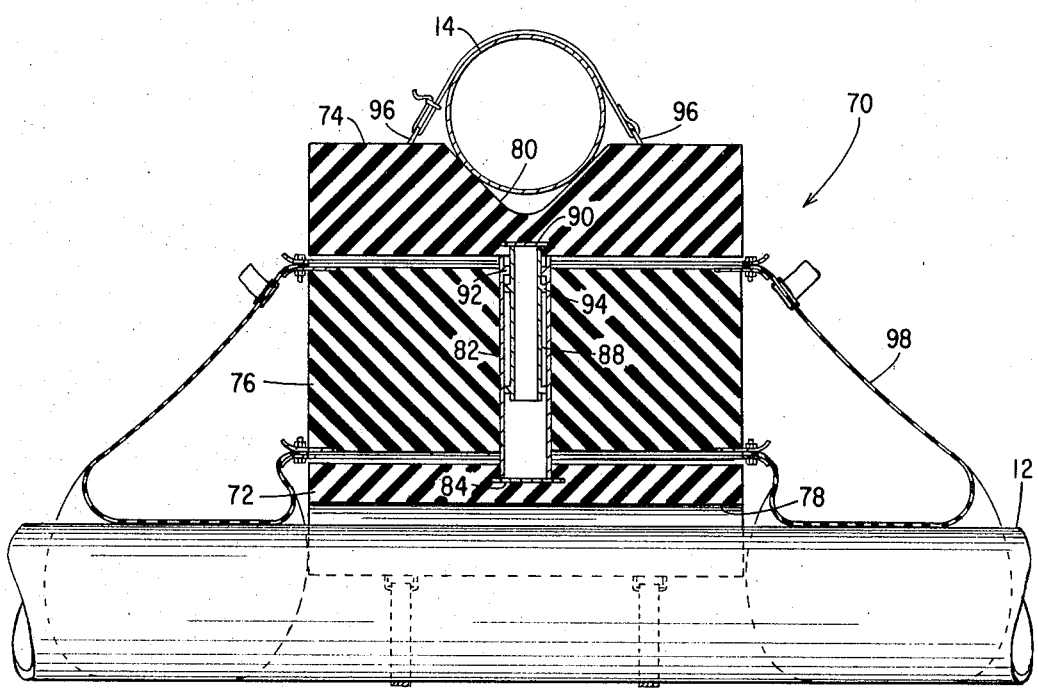
FIG. 4 is a sectional view of a pipeline separation system incorporating a third embodiment of the invention.

A third embodiment of the invention is illustrated in FIG. 4. Separation unit 70 includes three relatively rigid elastomeric members including a lower member 72, an upper member 74, and a third member 76 sandwiched between members 72 and 74. Member 72 is provided with a preformed saddle 78, and member 74 is provided with a similar preformed saddle 80.

A short pipe 82 having a flange 84 is molded into the lower elastomeric member 72 and extends upwardly therefrom through member 76. Pipe 82 extends above the upper surface of member 76 and engages the underside of the upper member 74 normally to provide a small gap 86 between members 74 and 76. A pipe 88 of diameter smaller than pipe 82 has a flange 90 molded into upper member 74 and extends downwardly therefrom into the pipe section 82. Flanges 92 and 94 are provided on pipes 82 and 88 for preventing separation of the component parts of unit 70.

Member 74 is further provided with tie loops 96 molded into the top of member 74. This permits the use of straps connected to loops 96 to secure the member 74 to the upper pipeline of a pipeline crossing. Similar anchoring means are provided to secure lower member 72 to a bottom line.

In use of unit 70, a crossing is prepared by raising the upper line to provide suitable clearance. Thereafter, unit 70 is submerged and is positioned between the lines at their crossing. Alignment of saddles 78 and 80 may be adjusted by a diver because of the low friction characteristic of the connection comprising the pipes 82 and 88. Since only the end of pipe 82 bears against member 74, the frictional force opposing rotation of member 74 is low. This facilitates rotation of the member 74 to align the saddle 80 with the upper pipeline.

After unit 70 is in place and the saddles 78 and 80 are in alignment with the upper and lower pipelines, respectively, the upper pipeline is lowered into the saddle 80 of the upper elastomeric member 74. The weight of the upper pipeline in the saddle 80 forces the upper elastomeric member 74 downwardly, impaling member 74 on pipe 88 and closing the gap 86. Pipe 82 is forced into member 74. Thereafter, the elastomeric members 72, 74 and 76 comprising the pipeline separation system 70 maintain the predetermined separation between the pipelines at the crossing location.

Unit 70 may also be provided with an annular flexible casing 98 extending around the intermediate elastomeric member 76. Casing 98 is filled with a cementitious setting material after the upper line has been lowered into the saddle 80. As the casing 98 is filled, it droops to the configuration illustrated in dashed lines in FIG. 4, whereby the cementitious material within the casing 98 provides a firm base and anchor for unit 70. Casing 98 may be provided with openings on the top surface portion to permit egress of air or water during filling.

In the description of the installation of the system described above, the separation unit was placed and filled with grout while a hoist barge hovered above the site of the crossing. It will be understood that while such operation can be carried out, the final relative positioning between the two pipelines may be accomplished long before grout is placed in the unit. When such is the case, the casing 20, FIG. 1, may rise of its own accord during the filling by grout to form a saddle beneath the upper line as well as a saddle over the lower line. In accordance with such mode, a barge with hoisting capability would be employed to traverse a pipeline, stopping at each of several points where the line crosses another line. The hoist is employed to raise the line, permitting the insertion of temporary mechanical supports between the upper and lower pipelines to establish and temporarily maintain the desired separation. The barge with such hoisting capability may then be released from the job site. Thereafter, placement and grouting of the pillows could proceed behind the hoisting barge and could be conducted from a vessel or barge which only is required to have diver support and the capability of grout pumping.

Reference has been made to saddles and envelopes in the foregoing description in terms of elastomeric members. It will be appreciated that other materials may be employed. Metals or plastic could be used to form saddles such as shown in FIG. 2. Nonelastomeric fabrics might well be used for the envelopes of FIGS. 1–4 or plastic materials of nonelastomeric nature such as polyethylene may be employed.

Having described the invention in connection with certain specific embodiments thereof, it is to be understood that further modifications may now suggest themselves to those skilled in the art and it is intended to cover such modifications as fall within the scope of the appended claims.

What is claimed is:

1. In combination with a pair of pipelines submerged beneath the surface of a body of water and crossing one another at a substantial angle, an improved system for maintaining vertical separation between the pipelines, which comprises:
   a. a submergible structure adapted for positioning between the pipelines while the upper pipeline is supported in a raised condition relative to the lower pipeline and comprising a lower member having a saddle for receiving and enveloping a top portion of the lower pipeline and an upper member having a saddle for receiving and enveloping a bottom portion of the upper pipeline, and
   b. load bearing means positioned between and coupled to said upper and lower members for maintaining a predetermined vertical separation between said members and thereby maintaining vertical separation between the pipelines following release of the upper pipeline into load bearing engagement with the saddle of the upper member, said load bearing means comprising a flexible casing adapted to be submerged evacuated and positioned between the pipelines and means for filling said casing with cement to assure maintenance of the predetermined separation between the pipelines.

2. The system according to claim 1 wherein the upper and lower members comprise relatively rigid disks having the upper and lower saddles preformed therein, and wherein the flexible casing is connected between said members and cement fills said casing to maintain a predetermined separation between the members.

3. The system according to claim 1 further characterized by adjustable means securing said members to said flexible casing and for permitting selective adjustment of the angular relationship between the saddles of the upper and lower members.

4. The system according to claim 1 wherein said members comprise flexible members defining the upper and lower surfaces of said casing, respectively, with means to introduce unset cement so that the saddles form in said members by deformation through contact with said pipelines when cement is received in said casing.

5. The system according to claim 1 wherein:
   a. said members are relatively rigid disks having the pipeline receiving saddles preformed therein,
   b. said load bearing means comprises a third disk positioned between the upper and lower members, and
   c. coupling means between said members permits selective relative rotation between said members for selective adjustment of the angle between the saddle of said upper member and the saddle of said lower member.

6. The system according to claim 5 wherein said coupling means comprises concentric telescoped pipe means extending from the lower surface of said upper member and the upper surface of said lower member with the larger of said pipes longer than the thickness of said third disk and the smaller of said pipes being shorter than the thickness of said third disk.

7. A stabilized pipeline crossing which comprises:
   a. a pair of submerged pipelines one crossing over the other,
   b. a flexible casing disposed between the pipelines filled with grout and having saddles formed on top and bottom partially to envelop said pipelines, said grout forming substantially rigid structure when set between said saddles for maintaining a predetermined vertical separation between said pipelines,
   c. said flexible casing being adapted for submerging in an evacuated state with means for attachment to the lower and upper pipeline when in predetermined vertical separation,
   d. a flow connection for filling said casing with cement to harden and maintain said saddles spaced apart, and
   e. an exhaust port in the upper surface of said casing for escape of entrapped air or salt water during introduction of said cement.

8. The combination according to claim 7 wherein:
   a. upper and lower relatively rigid elastomeric members have pipeline receiving saddles preformed therein,
   b. a resilient casing interconnects said elastomeric members, and
   c. a flow conduit extends through said upper member means for subsequently filling said casing with a cement which when set maintains a predetermined separation between said members.

9. The combination of claim 8 wherein said casing is shaped to have a narrow neck secured to said upper member and a narrow skirt secured to said lower member with an enlarged waist portion therebetween.

10. A submerged pipeline anchor which comprises:
    a. a submergible flexible casing adapted to lay over said pipeline comprising a lower member contacting a top portion of said pipeline, an upper member, and a side wall member integral with said upper and lower members,
    b. means to fill said casing with cement to envelop the top portion of said pipeline and assist in maintaining a predetermined position of said pipeline,
    c. a screened opening in said upper member, and
    d. a grout supply line fixture means in said upper member.

11. The combination set forth in claim 10 wherein said upper member has a pair of screened openings overlying said pipeline and two supply line fixtures, one on each side of said pipeline.

* * * * *